United States Patent

Sakoda et al.

[11] Patent Number: 6,021,125
[45] Date of Patent: Feb. 1, 2000

[54] CELLULAR WIRELESS COMMUNICATIONS SYSTEM AND BASE STATION

[75] Inventors: Kazuyuki Sakoda, Tokyo; Mitsuhiro Suzuki, Chiba; Tomoya Yamaura, Tokyo, all of Japan

[73] Assignee: Sony Corporation, Tokyo, Japan

[21] Appl. No.: 09/168,701

[22] Filed: Oct. 8, 1998

[30] Foreign Application Priority Data

Oct. 16, 1997 [JP] Japan ................................. 9-283263

[51] Int. Cl.[7] .................................................. H04J 3/00
[52] U.S. Cl. .......................... 370/345; 455/405; 455/436
[58] Field of Search .................................. 370/345, 314, 370/310, 328, 329, 330, 331, 332, 333, 334, 336, 337, 341, 343, 344, 347, 349, 380, 436, 437, 442; 455/405, 421, 422, 434, 436, 439, 440, 442, 447, 450, 452, 507, 509, 513, 522, 524, 525

[56] References Cited

U.S. PATENT DOCUMENTS

| | | | |
|---|---|---|---|
| 5,379,447 | 1/1995 | Bonta et al. | 370/468 |
| 5,412,658 | 5/1995 | Arnold et al. | 370/337 |
| 5,491,837 | 2/1996 | Haartsen | 370/337 |
| 5,579,306 | 11/1996 | Dent | 370/330 |
| 5,581,548 | 12/1996 | Ugland et al. | 370/330 |
| 5,732,328 | 3/1998 | Mitra et al. | 455/522 |
| 5,734,967 | 3/1998 | Kotzin et al. | 370/252 |
| 5,740,166 | 4/1998 | Ekemark et al. | 370/331 |
| 5,878,328 | 3/1999 | Chawla et al. | 455/450 |

*Primary Examiner*—Dang Ton
*Assistant Examiner*—Phirin Sam
*Attorney, Agent, or Firm*—Limbach & Limbach, LLP

[57] ABSTRACT

A cellular wireless communication system for further improving the quality of communications. The base station (BS11) notifies the communication channel which the mobile station (MS10) is using, to the base stations (BS12, BS13) having the lower pathloss than the own station, the base stations receive said communication channel and transmit the reception signals (S2, S3) to the connection switching station (11), and the connection switching station combines respective reception signals (S1–S3) to be transmitted so as to restore the data transmitted from the mobile station, and thereby the reception signal received at the base station having the satisfactory receiving condition can be combined and the diversity reception using the whole system can be conducted, so that the quality of communications from the mobile station to the base station can be easily improved.

21 Claims, 8 Drawing Sheets

CELLULAR WIRELESS COMMUNICATIONS SYSTEM AND BASE STATION

BACKGROUND OF THE INVENTION

1. Field of the Invention

The present invention relates to a cellular wireless communication system and base station, and is suitably applied to, for example, a portable telephone system.

2. Description of the Related Art

Heretofore, in a cellular wireless communication system, an area for offering the communication service is divided into cells of the desired size and base stations as the fixed stations are provided in each cell and a communication terminal device as a mobile station to wireless communicate with the base station which is considered having the optimal communication condition. In this case, although various systems are proposed as the communication system between the communication terminal device and the base station, there is a time division multiple access system called Time Division Multiple Access (TDMA) as a typical system.

This TDMA system is a system that divides one frequency channel into time slots and transmits reception signal at the timing of slot assigned to own station, and the same frequency channel can be used in multiple communications (multiplex communications) effectively utilizing frequency.

At this point, the cellular wireless communication system of the TDMA system is described with reference to FIG. 1 as follows. As shown in FIG. 1, in the cellular wireless communication system 1, a service area is divided into multiple cells C1–C7 and base stations BS1–BS7 are provided in each of these multiple cells C1–C7. Users can wireless communicate with the base station from any position in the service area. In this case, the base stations BS1–BS7 provided in each cell C1–C7 are connected to a connection switching station 2 of the higher stage, which controls these base stations BS1–BS7, signal to be transmitted from each base station BS1–BS7, and the signal path of signals to be sent to each base station BS1–BS7 by circuit switching.

In case where the communication terminal device MS1 as a mobile station communicates in the service area of this cellular wireless communication system 1, said communication terminal device MS1 selects a base station having the best communication condition from among these base stations BS1–BS7, and can communicate user information such as audio signal by connecting with said base station via wireless circuit. For example, if the communication terminal device MS1 is located in the vicinity of the base station BS1, the optimal communication condition which can be obtained between said base station BS1 and the communication terminal device MS1, is wireless connected to said base station BS1. At this point, the base station BS1 transmits the reception signal received from the communication terminal device MS1 to the connection switching station 2 of the higher stage. Contrary to this, the base station BS1 transmits the transmission signal received from the connection switching station 2 to the communication terminal device MS1.

The connection switching station 2 applies the decoding processing, that is channel decoding, to the reception signal received from the base station BS1, and transmits the resulting reception data to a terminal device 4 of the communicating party via a public circuit net 3. Moreover, the connection switching station 2 receives data to be transmitted from the terminal device 4 of the communicating party via the public circuit net 3, forms transmission signal by applying the coding processing, that is channel encoding, and sends said transmission signal to the base station BS1. With this series of processings, the communication terminal device MS1 can communicate with the terminal device 4 of the communicating party via the base station BS1, the connection switching station 2 and the public circuit net 3.

However, as the communication terminal device MS1 moves from one place to another, there are cases where the base station to which said communication terminal device MS1 to be connected is changed. For example, this example applies to the case where the communication terminal device MS1 moves from a cell C1 that is the service area of the base station BS1, to a cell C2 that is the service area of the base station BS2. At this point, the communication terminal device MS1 conducts the connection switching of wireless circuit from the base station BS1 to the base station BS2, i.e., handoff, and conducts wireless communication with newly connected base station BS2. By conducting such handoff, even in the case where the communication terminal device MS1 moves, communications can be continued by sequentially switching base stations.

In order to conduct the handoff, it is necessary to constantly look for "the mobile station should be connected to which base station". In general, in the cellular wireless communication system 1, the communication terminal device MS1 which is a mobile station, receiving the signals of the control channel (hereinafter referred to as control channel CCH) to be transmitted from each base station BS1–BS7, measures these reception power respectively, and determines the base station having the largest reception power as a candidate for the base station of handoff destination. Thus, the mobile station side determines a base station candidate of the handoff destination.

In this connection, the final decision on whether to conduct the handoff or not is made by the base station side. As the flow of handoff processing, "the mobile station finds a candidate for the handoff destination, and based on this result, the base station conducts the handoff". More specifically, the base station constantly monitors whether the reception power from the communication terminal device in communication is enough or not enough, and in case where satisfactory quality of communication cannot be obtained due to shortage of the reception power, the base station decides the handoff of said communication terminal device to another base station. In that case, the base station executes handoff to the base station which is notified from the communication terminal device as a candidate for handoff. In this connection, there are cases where the communication terminal device demands the handoff due to drop of the reception power in the communication terminal device from the base station. However, also in this case, the final decision whether to conduct the handoff or not is made by the base station side.

In the conventional cellular wireless communication system 1, there are cases where the base station is changed successively as the communication terminal device moves, however, it basically communicates with one base station. In this case, in the cellular wireless communication system 1, one base station which is considered having satisfactory communication condition is selected relative to the reception power, and makes said base station and the communication terminal device communicate each other. However, in practice, the base station having the satisfactory communication condition is not limited to one station but there are many cases where multiple base stations having favorable communication conditions exist. In that case, not selecting one base station to communicate but rather using the reception signals received by such base stations with satisfactory communication conditions, it is considered that the quality of upward communication (signal direction from the communication terminal device to the base station) can be easily improved.

Furthermore, in such a conventional cellular wireless communication system 1, the reception power of the downward control channel CCH to be transmitted from the base station is measured in the communication terminal device, a base station candidate of handoff destination is found based on said measured power, and said candidate is notified to said base station. And in the base station, when the reception power of the upward signal to be transmitted from the communication terminal device becomes no longer enough, making said timing as a trigger, said communication terminal device is conducted handoff to the base station of said handoff destination. However, if the handoff is conducted according to this method, it causes a problem that the handoff is conducted to the most satisfactory base station from the standpoint of communication terminal device but said base station is not necessarily the best base station in the whole system. More specifically, in the handoff method of the conventional cellular wireless communication system 1, the destination of handoff is decided by the decision of one side, and thus caused an inconvenience as described above. Accordingly, if the destination of handoff is determined considering all aspects, it is considered that the optimal base station can be found, and the quality of communication between the communication terminal device and the base station can be improved.

SUMMARY OF THE INVENTION

In view of the foregoing, an object of the present invention is to provide a cellular wireless communication system and base stations which are capable of further improving the quality of communications.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) The First Embodiment

Figure 1:
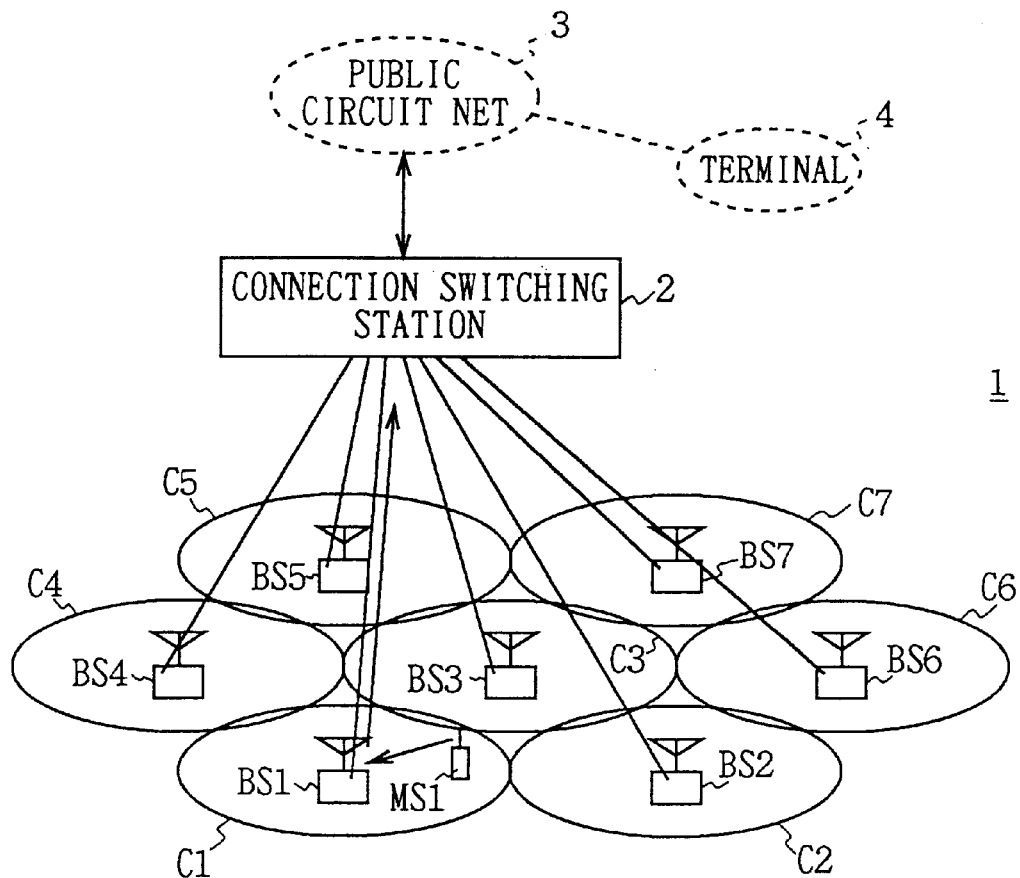
FIG. 1 is a block diagram showing the general construction of a cellular wireless communication system.
Figure 2:
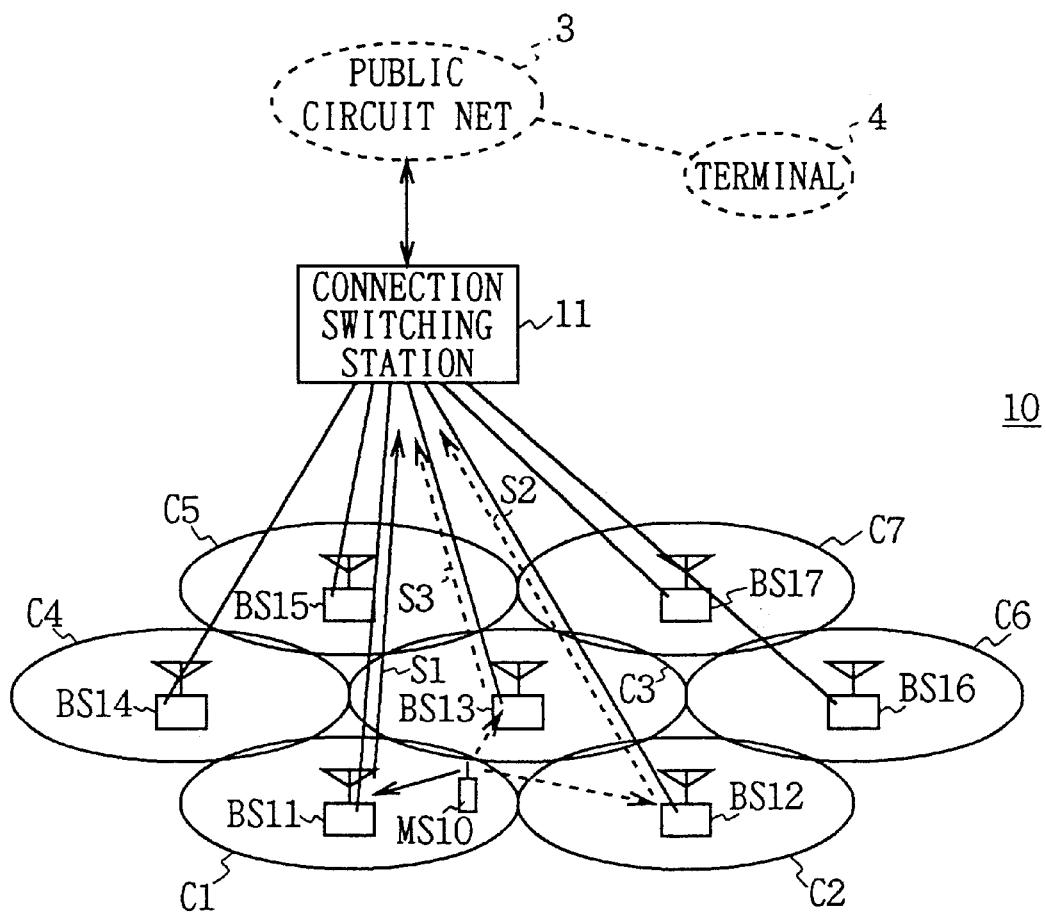
FIG. 2 is a block diagram showing a cellular wireless communication system according to the first embodiment.

In FIG. 2, in which the corresponding parts to FIG. 1 are given the same reference numerals, 10 generally shows a cellular wireless communication system to which the present invention is applied. In this cellular wireless communication system 10, an area for offering the communication service is divided into cells C1–C7 having the desired size, base stations BS11–BS17 are provided in said cells respectively as the fixed stations, and a communication terminal device MS10 as the mobile station wirelessly communicates with the base station which is considered having the best communication condition.

Furthermore, in this cellular wireless communication system 10, communication is not only conducted between the base station BS11, BS12, BS13, BS14, BS15 or BS17 and the communication terminal device MS10 using TDMA system, but by successively switching the frequency of communication channel (hereinafter referred to as traffic channel) to be used for transmission and reception per slot, that is frequency hopping is conducted. Thus, constantly avoiding the same channel interference, the communication can be prevented from the interference caused by interference waves.

Furthermore, in this kind of wireless system, when conducting the desired communication, there are cases where signal transmission has to be conducted with large transmission power, and there are cases where satisfactory transmission can be conducted with low transmission power depending on where the mobile station is located. Taking this into consideration, in this cellular wireless communication system 10, the base stations BS11–BS17 and the communication terminal device MS10 monitor the reception power (or the quality of reception signal) each other, and by mutually informing of these monitoring results, feedback loop is formed, and so as to conduct the transmission power control which communicates with the minimum transmission power. Thus, in the cellular wireless communication system 10, communication can be conducted effectively with the minimum possible transmission power, and as compared with the case of transmitting with the fixed electric power, the consumption of the electricity can be decreased. Thereby, special effects, such as the battery life can be extended, can be obtained for the communication terminal device MS10.

At this point, in this cellular wireless communication system 10, when the communication terminal device MS10 moves in the service area, the pathloss (transmission pathloss between the base station) sequentially changes. For example, if the communication terminal device MS10 moves during communicating with the base station BS11, the pathloss sequentially changes between the base station BS11. Thereby, the transmission power changes, and when the pathloss grows so big that no longer satisfactory communication can be maintained, it becomes necessary to conduct the handoff from the base station BS1 in communication to the other base station.

Accordingly, the communication terminal device MS10, receiving the control channel CCH (the transmission power of this control channel CCH is constant) to be transmitted from each base station BS11–BS17 during communication with the base station BS11 at the predetermined timing, calculates the reception power of each control channel CCH, and measures the pathloss between each base station BS11–BS17 by the power ratio between the reception power and the transmission power. Then, the communication terminal device MS10 notifies the value of this measured pathloss between each base station BS11–BS17 to the base station in communication as the pathloss information with the name of base station. Moreover, the base station BS11 in communication with the communication terminal device MS10 constantly monitors how much transmission power is being used for communication with said communication terminal device MS10.

The base station BS11 in communication, based on the pathloss information to be transmitted from the communication terminal device MS10, obtains the pathloss value Y between its own station (BS11) and the communication terminal device MS10 and the pathloss ratio X/Y between the pathloss value X between the peripheral base stations BS12–BS17 and the communication terminal device MS10. The base station BS11 then detects whether there exists any base station of which said pathloss ratio X/Y is lower than the predetermined threshold value p or not. As a result, if the base station having the pathloss ratio X/Y lower than the predetermined threshold value p, the base station BS11 notifies the traffic channel which is being used for communication with the communication terminal device MS10 (to be more specific, it is frequency hopping pattern of said traffic channel) to said base station via the connection switching station 11. For example, if the pathloss ratio X/Y of the base stations BS12 and BS13 is lower than the threshold value p, the base station BS11 notifies the traffic channel presently using for communication with the communication terminal device MS10 to said base stations BS12 and BS13. In this connection, as the threshold value p of the pathloss ratio X/Y to be used here, "1/8"–"1" is reasonable, and especially "1/4"–"1/2" is desirable.

The base station notified of the traffic channel receives said traffic channel, and measures the signal-to-interference wave power ratio C/I of the signal to be transmitted via said traffic channel. As a result, if the signal-to-interference wave power ratio C/I is larger than the predetermined threshold value q, that base station transmits the received signal obtained by the reception of the traffic channel to the connection switching station 11 of the higher stage. More specifically, as described above, if the base stations BS12 and BS13 are notified of the traffic channel, said base stations BS12 and BS13 receive the traffic channel, and measure the signal-to-interference wave power ratio C/I respectively. If said value exceeds the threshold value q, said base stations BS12 and BS13 transmit the reception signals S2 and S3, to the connection switching station 11 of the higher stage. As the threshold value q of the signal-to-interference wave power ratio C/I to be used here, "1"–"10" is reasonable, and especially "4"–"7" is desirable.

The connection switching station 11 also receives the reception signal S1 of the traffic channel received by the base station BS11 in communication with the communication terminal device MS10, from the base station BS11. The connection switching station 11 combines said reception signal S1 with reception signals S2 and S3 received from the peripheral base stations BS12 and BS13 by using the maximum ratio combining method and applying the channel decoding to said combined reception signal, decodes the data transmitted from the communication terminal device MS10, and transmits said data to the terminal device 4 which is the communicating party of the communication terminal device MS10 via the public circuit net 3. In this connection, said maximum ratio combining method is the method to combine each signal at the predetermined ratio. As the ratio at the time of combining, coefficient corresponding to the signal-to-interference wave power ratio C/I is used.

Accordingly, since the signal transmitted from the communication terminal device MS10 is not only received by the base station BS11 but also received by the base stations BS12 and BS13 having the satisfactory signal receiving condition, and since reception signals S1–S3 are combined by the connection switching station 11, the site diversity reception using the whole system can be conducted, and the quality of communication of upward circuit can be improved easily.

In this connection, the base station informed of the traffic channel, after observing the signal-to-interference wave power ratio C/I from the communication terminal device MS10 during the fixed period of time, if the ratio that said signal-to-interference wave power ratio C/I does not exceed the threshold value q, is larger than the predetermined threshold value r, said base station informs the termination of receiving the traffic channel to the connection switching station 11 and terminates the reception of said traffic channel. Thus, when the pathloss value X notified from the communication terminal device MS10 is a mistake, or the radio wave condition changes due to the movement of the communication terminal device MS10, the signal receiving condition becomes worse but vain efforts of continuing signal receiving processing can be avoided, and the signal receiving processing can be terminated quickly. As the threshold value r to be used here, "2"–"30" percent is reasonable and especially "5"–"10" percent is desirable.

According to the foregoing construction, in the case of cellular wireless communication system 10 according to this embodiment, for example, if the communication terminal device MS10 is communicating with the base station BS11, said communication terminal device MS10 measures the pathloss value between each base station BS11–BS17 by receiving the control channel CCH of each base station BS11–BS17, and informs said measured pathloss value to the base station BS11 in communicating. The base station BS11, receiving said pathloss, calculates the pathloss ratio X/Y between the pathloss value of own station Y and the pathloss value X of the peripheral base station BS12–BS17, and detects whether said pathloss ratio X/Y is lower than the threshold value p or not. As a result, if there exists any base station having the pathloss ratio X/Y lower than the threshold value p, the base station BS11 notifies the traffic channel using for communication with the communication terminal device MS10 to the base stations (in the case of FIG. 2, base stations BS12 and BS13).

The base stations notified of traffic channel (BS12 and BS13) receive said traffic channel, and measure the signal-to-interference wave power ratio C/I. In the case where it becomes clear that the signal receiving condition is satisfactory because the signal-to-interference wave power ratio C/I is larger than the threshold value q, said base stations transmit the reception signals (S2 and S3) obtained by receiving the traffic channel to the connection switching station 11 of the higher stage. The connection switching station 11 combines the reception signal S1 to be transmitted from the base station BS11 and the reception signals (S2 and S3) to be transmitted from the peripheral base stations (BS12 and BS13), applies the channel decoding to the resulting reception signal, and restores the data transmitted from the communication terminal device MS10.

Accordingly, the signal transmitted from the communication terminal device MS10 is not only received by the base station BS11 in communication but also received by the peripheral base stations (BS12 and BS13) having satisfactory signal receiving condition, these received signals S1–S3 are combined, and the data transmitted from the communication terminal device MS10 is restored. Thereby, the quality of communication of upward circuit can be easily improved by conducting the diversity reception using multiple base stations. The reason that the quality of communication can be improved by diversity reception, lies in the degradation in quality of the reception signal of one side can be compensated by the reception signal of the other side.

According to the foregoing construction, since the signal from the communication terminal device is not only received by the base station to be communicated, but also received by the peripheral base stations having good signal receiving condition, and these reception signals are combined so as to restore the data transmitted from said communication terminal device is restored, the quality of communication in the direction from the communication terminal device to the base station can be easily improved.

(2) The Second Embodiment

Figure 3:
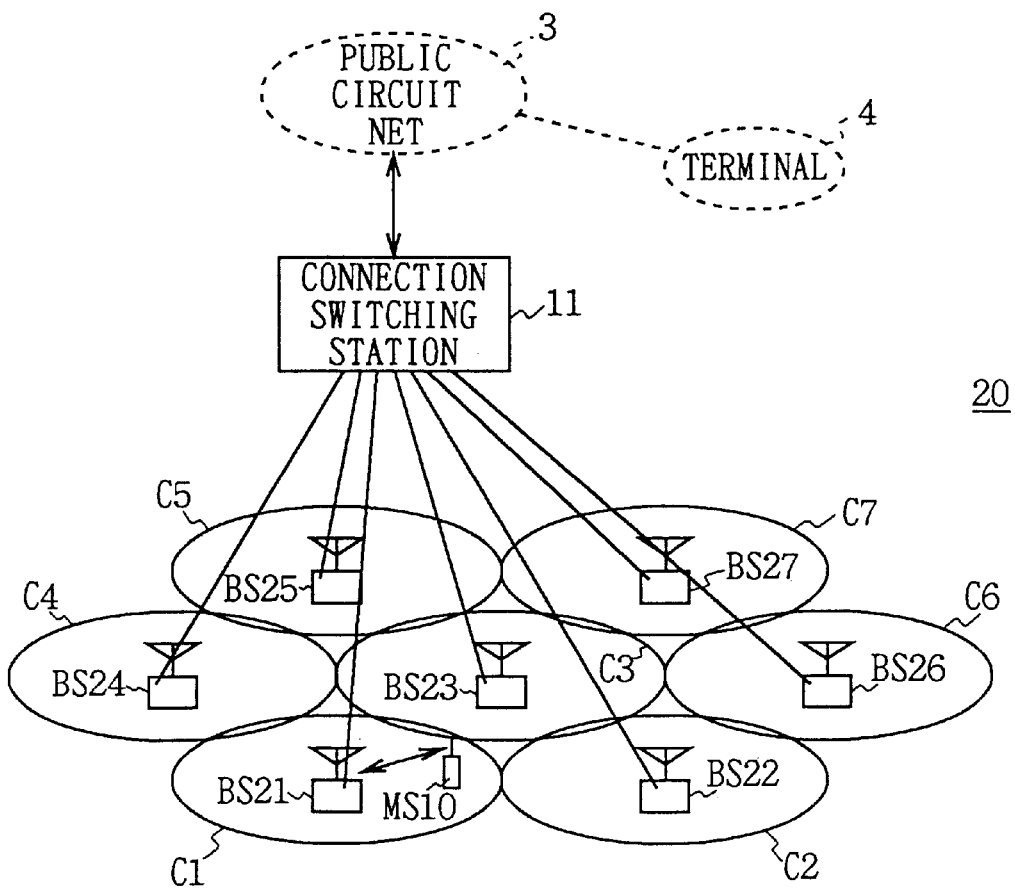
FIG. 3 is a block diagram showing a cellular wireless communication system according to the second embodiment.

In this second embodiment, the cellular wireless communication system in which an invention associated with handoff is added to the first embodiment is described. In FIG. 3, in which the corresponding parts of FIG. 2 are designated the same reference numerals, 20 generally shows the cellular wireless communication system according to the second embodiment. In this cellular wireless communication system 20, an area for offering the communication service is divided into cells C1–C7 having the desired size, base stations BS21–BS27 are provided in said cells respectively as the fixed station, and the communication terminal device MS10 as a mobile station communicates with the base station which is considered having the optimal communication condition.

Furthermore, in this cellular wireless communication system 20, not only the communication between the base station BS21, BS22, BS23, BS24, BS25, BS26, or BS27 and the communication terminal device MS10 is conducted by the TDMA system, but also changing the frequency of traffic channel to be used for signal transmission and reception per slot, so called frequency hopping is conducted. Thus, it is prevented from constantly receiving the same channel interference, and the communication disturbance due to the interference wave can be prevented in advance.

Furthermore, in this cellular wireless communication system 20, base stations BS21–BS27 and the communication terminal device MS10 monitor the reception power each other, and by mutually informing of these monitoring results, feedback loop is formed so as to conduct the transmission power control which communicates with the minimum transmission power. Thus, in the cellular wireless communication system 20, communication can be conducted efficiently with the minimum possible transmission power, and the power consumption can be decreased as compared with the case of transmitting with the fixed electric power. Thereby, the communication terminal device MS10 can achieve the special effect such as the operation time of battery can be increased.

Furthermore, in this cellular wireless communication system 20, the communication terminal device MS10 measures the pathloss between each base station BS21–BS25 by receiving the control channel CCH to be transmitted from each base station BS21–BS27, and notifies said measured pathloss value as the pathloss information to such the base station BS21 in communication. Also, the base station BS21 in communication with the communication terminal device MS10 constantly monitors how much transmission power is being used to communicate with said communication terminal device MS10.

At this point, the cellular wireless communication system 20 according to this embodiment, the base station BS21 in communication with the communication terminal device MS10 judges whether it is better for said communication terminal device MS10 to be connected to the other base station or not, i.e., to conduct handoff or not, based on the pathloss information from the communication terminal device MS10 or the value of transmission power using for communicating with the communication terminal device MS10. More specifically, if the base station BS21 in communication with the communication terminal device MS10 finds that there exists the base station having the equal pathloss or lower pathloss than the base station BS21 based on the pathloss information, or that there exists the transmission power of the transmission signal to transmit to the communication terminal device MS10 exceeds the predetermined reference value, the base station BS21 judges better that the communication terminal device MS10 should be handed off to the other base station. And when the base station BS21 so determines, transmits the control signal showing the possible handoff of communication terminal device MS10 to the peripheral base stations via the connection switching station 11.

In this connection, in the case where the transmission power exceeds the reference value, the base station BS21 in communication with the communication terminal device MS10, transmits the control information to all peripheral base stations BS22–BS27. In the case where the peripheral base station having the same pathloss or lower pathloss than own station exists, the base station BS21 transmits said control information to only the peripheral base station having small pathloss. Said control information contains frequency hopping pattern of the traffic channel to be used in communication with the communication terminal device MS10 (hereinafter, it is merely referred to as hopping pattern) and the hopping pattern of the traffic channels (for multiple channels) which is not used in the base station BS21.

Figure 4:
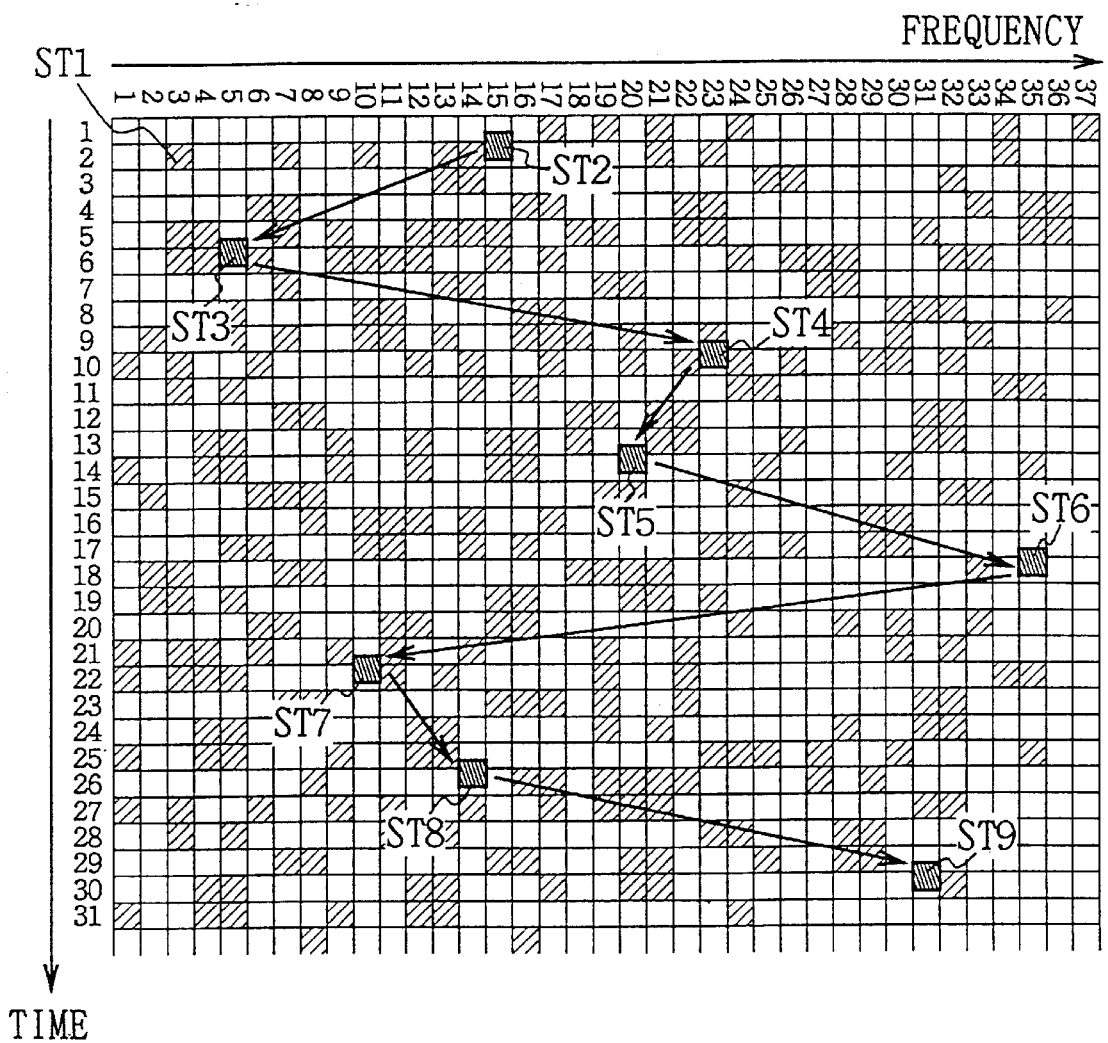
FIG. 4 is a schematic diagram illustrating an example of traffic channel allocation.

At this point, an example of allocation of the traffic channels in this cellular wireless communication system 20 is shown in FIG. 4. In this cellular wireless communication system 20, by conducting the frequency hopping, each traffic channel changes frequency band to occupy per slot. Accordingly, if the frequency resource to be used in the base station is expressed by using the frequency axis and time axis, it becomes as shown in FIG. 4. FIG. 4 is an example of allocation of the traffic channels in the base station BS22, and slots on which oblique lines from the right are drawn, such as the slot ST1, are slots which are used in communication in the base station BS22. In said example approximately one third of frequency resources are used for communication, and the remaining two third are not used in communication. Moreover, in FIG. 4, slots ST2–ST9 shown by the oblique lines from the left show slots which are used in communication between the communication terminal device MS10 and the base station BS21. If the base station BS22 receives control information from the base station BS21, said base station BS22 grasps hopping patterns of these slots (ST2–ST9) based on said control information.

At this point, if the base station BS22 receives control information, said base station BS22 grasps the hopping pattern of traffic channel occupied by the communication terminal device MS10 based on that control information, follows to the frequency and the time occupied by said communication terminal device MS10 per slot, and receives the traffic channel which the communication terminal device MS10 is using. Then, the base station BS22 measures the reception power of each slot, and when it finishes measuring the power over multiple slots (e.g., 60–300 slots), calculates the average reception power A per slot based on these measures values.

In the same way, the base station BS22 received the control information, grasps the hopping pattern of the traffic channel that is not used in the base station BS21 based on said control information, and upon receiving said traffic channel, measures the reception power per slot. When the base station BS22 terminates the power measurement over multiple slots, it calculates the average reception power B per slot based on said measurement results .

The average reception power A calculated here is the average reception power in which the reception power from the communication terminal device MS10 and the interference wave power from the other radio wave dispatching source are added. Also, the average reception power B is the interference wave power from the other radio wave dispatching source. Accordingly, the value C, the average reception power B is subtracted from the average reception power A, becomes the actual reception power from the communication terminal device MS10.

In the base station BS22, the reception power C is obtained by subtracting the average reception power B from the average reception power A. If said reception power C exceeds the predetermined threshold value s, the base station BS22 judges that the power receiving condition is satisfactory, and it is better to connect the communication terminal device MS10 to the own station, and transmits the reply information that specifies to connect said communication terminal device MS10 to own station to the base station BS21 of the information source. In this connection, said reply information includes the information of reception power C calculated. Moreover, as for the determined threshold value s, if let the average reception power per slot from the communication terminal device in communication with the base station BS22 to be D, the value said average reception power D is multiplexed by the variable N (as the value of variable N, "1.5"–"8" is adequate and approximately "2" is most desirable), is used.

In this connection, in the case where the control information is transmitted to the multiple base stations from the base station BS21, all base stations received said control information conduct the same processing as above. After measuring the reception power C from the communication terminal device MS10, if its value is larger than the threshold value s, said base stations transmit the reply information specifying to connect the communication terminal device MS10 to own station, to the base station BS21.

The base station BS21 of the notification source determines the base station of handoff destination based on the received reply information. More specifically, if the base station which sent the reply information is only one, the base station BS21 determines said base station as the handoff destination, and if there exist multiple base stations which sent the reply information, the base station BS21 decides the base station having the largest reception power C included in the reply information as the handoff destination. Thus, since the reception power C is included in the reply information, even there are multiple base station which sent back answers, the optimal base station can be easily determined.

When the base station BS21 of the informing source determines the base station of handoff destination, receives channel information showing the channel information (said channel information contains at least the hopping pattern of the traffic channel and the initial transmission power) to be used for communicating with the communication terminal device MS10 from said base station of handoff destination, and transmits said channel information to the communication terminal device MS10 via the wireless circuit. Accordingly, the communication terminal device MS10 conducts the handoff processing with the base station of handoff destination based on said channel information, and connects with said base station of handoff destination.

The base station BS21 of the handoff source which was communicating a little while ago, holds the channel information received from the base station of handoff destination, and based on said channel information, the base station BS21 receives the traffic channel which the communication terminal device MS10 is newly using. More specifically, same as that of the first embodiment, the base station BS21 of handoff source receives the traffic channel which the communication terminal device MS10 is newly using, and measures its signal-to-noise power ratio C/I. If said signal-to-noise power ratio C/I is larger than the threshold value q, the base station BS21 judges that the signal receiving condition is satisfactory, and transmits the reception signal to the connection switching station 11 of the higher stage.

The connection switching station 11 combines the reception signal to be transmitted from the base station BS21 of handoff source, the reception signal to be sent from the base station of handoff destination, and the reception signal to be transmitted from the other base station by the maximum ratio combining method. The connection switching station 11 provides channel decoding to the resulting reception signal, decodes the data from the communication terminal device MS10, and transmits said data to the terminal device 4 which is the communicating party of the communication terminal device MS10 via the public circuit net 3. Thus, the diversity reception as the whole system can be conducted, and the quality of communication of upward circuit can be improved.

In this connection, in the base stations which receives the traffic channel of the communication terminal device MS10 (including the base station BS21 of handoff source) except the base station of handoff destination, as a result of measurement of the signal-to-interference wave power ratio C/I of the signal from the communication terminal device MS10 during the predetermined time period, if the ratio that said signal-to-interference wave power ratio C/I does not exceed the threshold value q is larger than the predetermined threshold value r, the termination of receiving said traffic channel is notified to the connection switching station 11 and the reception of traffic channel is terminated. Thus, continuous wasteful signal receiving processing under the bad signal receiving condition can be prevented.

Furthermore, the base station BS21 of the handoff source, holding the traffic channel which was used by the communication terminal device MS10 before as a vacant channel for the fixed time period after the handoff, periodically receives said traffic channel. And in the case where the communication terminal device MS10 fails in handoff, the base station BS21 communicates again to said communication terminal device MS10 using the former traffic channel which it is holding. Thus, even if the communication terminal device MS10 fails in handoff, the communication terminal device MS10 can be connected again to the former base station BS21. In this connection, since the communication terminal device MS10 failed in handoff informs the failure in the former traffic channel, the base station BS21 of handoff source can easily find whether the communication terminal device MS10 is succeeded in handoff or not if the base station BS21 is periodically receiving the former traffic channel.

Furthermore, the base station BS21 of the handoff source memorizes the communication terminal device MS10 conducted the handoff and the base station of handoff destination. In the case where the same communication terminal device MS10 conducts the handoff to the same base station several times for a short period of time, said determined threshold s is changed. More specifically, the value of said decided threshold value s is changed by increasing the value of variable N when deciding the decided threshold s. With this arrangement, in the case where the handoff is conducted repeatedly between the same base station, the number of handoffs can be decreased. And thus, when the threshold s is changed, there is the possibility that the communication terminal device MS10 communicates with the base station of which the pathloss should not become the minimum. However, in such cases, the base station does not compensate for the pathloss by increasing the transmission power but compensates for the pathloss by increasing the energy per bit in decreasing the transmission speed using in communication with the communication terminal device MS10. As a result, in the case where the communication terminal device MS10 communicates with the base station of which the pathloss should not become the minimum, the communication in which the transmission power per channel is decreased can be conducted maintaining the signal energy-to-noise energy ratio per bit Eb/No. In this case, since the transmission power itself should not be increased, it produces an effect in decreasing the interference wave power to the other base station.

At this point, the construction of base stations BS21–BS27 forming this cellular wireless communication system 20 is explained in detail. In this cellular wireless communication system 20, in practice, the slot of traffic channel is formed by multiple sub-carriers, and the communication between the base stations BS21–BS27 and the communication terminal device MS10 is conducted by allocating transmission symbols showing the transmission data to these multiple sub-carriers, that is multi-carrier communication is conducted. Accordingly, since the transmission symbols are allocated to these multiple sub-carriers, the transmission symbols is arranged on the frequency axis and is transmitted.

In this case, the operation to allocate transmission symbols to the sub-carriers and to arrange on the frequency axis is conducted according to the inverse fast Fourier transform processing (IFFT). Contrary to this, the operation to take out the transmission symbols arranged on the frequency axis onto the time axis is conducted according to the fast Fourier transform processing (FFT). Accordingly, in the case of measuring the reception power from the communication terminal device MS10 in the peripheral base stations, if the fast Fourier transform processing is conducted to the reception signal, the reception power can be measured.

However, in the peripheral base station, when measuring the reception power, the fast Fourier transform processing is executed with the period of ½ times (or ¼ times) with respect to the slot of traffic channel. The reason for this is explained as follows: If the communication terminal device MS10 is communicating with the base station BS21 same as that of the example described above, the timing of slot of the communication terminal device MS10 does not necessarily match to the timing of the peripheral base stations BS22–BS27. In FIG. 4 shown earlier, the timing of slot of the communication terminal device MS10 is slightly shifted with respect to the timing of slot of the base station BS22. Such timing shift of the slot is not the same in all peripheral base stations BS22–BS27, but different from base station to base station. And if the peripheral base station measures the reception power of the communication terminal device MS10, by using the timing of its own slot in a state in which the timing of slot is shifted from the peripheral base station to the base station, measurement errors of the reception power vary from the base station to the base station, and the reception power cannot be measured correctly. For example, in the peripheral base station having the timing matched to the timing of slot of the communication terminal device MS10 can measure the reception power almost correctly, however, the peripheral base station having the slot timing shifted for one half slot with respect to the communication terminal device MS10 can measure only one half of the actual reception power. Thus, if the accuracy in reception power to be measured is lost, it causes a problem that the handoff destination cannot be determined correctly.

Accordingly, in the peripheral base stations BS22–BS27, in the case of receiving the traffic channel, the reception power from the communication terminal device MS10 is measured upon dividing the slot by the time period of ½ times (or ¼ times) of the timing of its own slot. With this arrangement, the reception signal from the communication terminal device MS10 is completely stored in somewhere of the divided slot, and scattering of measurement error of the reception signal from base station to base station can be prevented in advance. In the case where the slot is divided by the period of ½ times, only half of the whole reception signal can be measured, but since the interference waves and noise elements also become one-half, this does not produce the redundancy of measurement error. Moreover, in the case where the slot is divided by the period of ¼ times, since the reception signal from the communication terminal device MS10 is stored in 3 slots out of 4 divided slots, the electric power for 3 divided slots should be regarded as the reception power.

Figure 5:
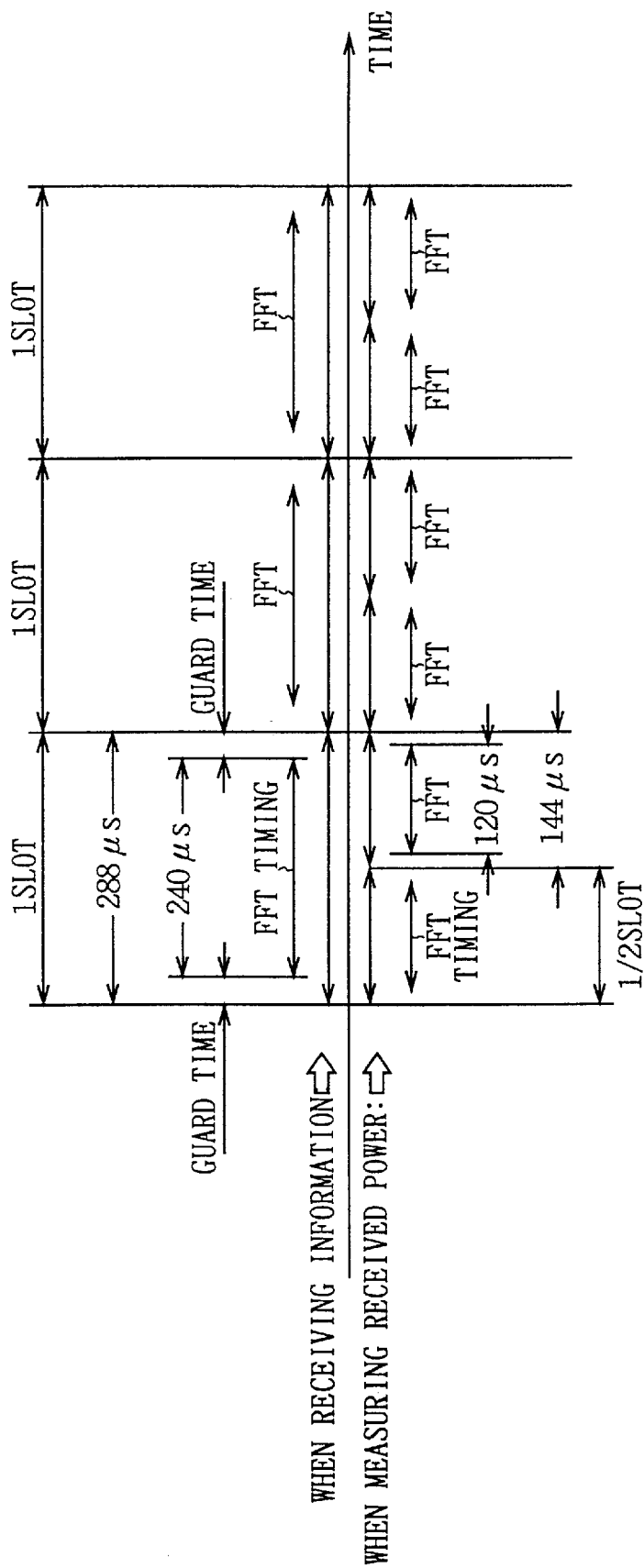
FIG. 5 is a schematic diagram illustrating the timing of the fast Fourier transform processing when measuring reception power.

At this point, based on the contents described above, the execution timing of the fast Fourier transform processing in the case of actually measuring the reception power in the base station is shown in FIG. 5. FIG. 5 shows an example when the fast Fourier transform processing is conducted by the period of ½ times to one slot of the traffic channel. The segment of 288 $\mu$s in FIG. 5 shows 1 slot of the traffic channel respectively, and the segment of 240 $\mu$s out of 1 slot is the segment prepared for actually transmitting the transmission symbol such as user information (in this connection, generally said 240 $\mu$s time is called 1 modulation time). Moreover, the remaining 48 $\mu$s segment is the segment for guard time in which the transmission symbol is repeated.

In general, in the case of receiving the signal transmitted via the traffic channel and demodulating the information, as shown in the upper stage of FIG. 5, the fast Fourier transform processing is conducted to the signal element of 240 $\mu$s, and signal element of the sub-carrier is taken out and then, the transmission symbol transmitted is extracted. Since 1 modulation time is 240 $\mu$s, the distance of sub-carrier fx becomes: fx=1/240 $\mu$s=4.166 kHz.

On the other hand, in the case of measuring the reception signal from the communication terminal device MS10 in the base station, a slot is divided into halves with the period of ½ times of the information demodulation time, and the fast Fourier transform processing is conducted per slot divided. However, in practice, since there are guard times, signal elements for 120 $\mu$s is extracted per 144 $\mu$s of the divided slot, and the fast Fourier transform processing is conducted on this in order to take out the signal element of the sub-carrier, the power measurement is conducted upon extracting the transmission symbols arranged on the frequency axis. Accordingly, at the time of reception power measurement, the fast Fourier transform processing is executed with twice the frequency of the information demodulation time.

Figure 6:
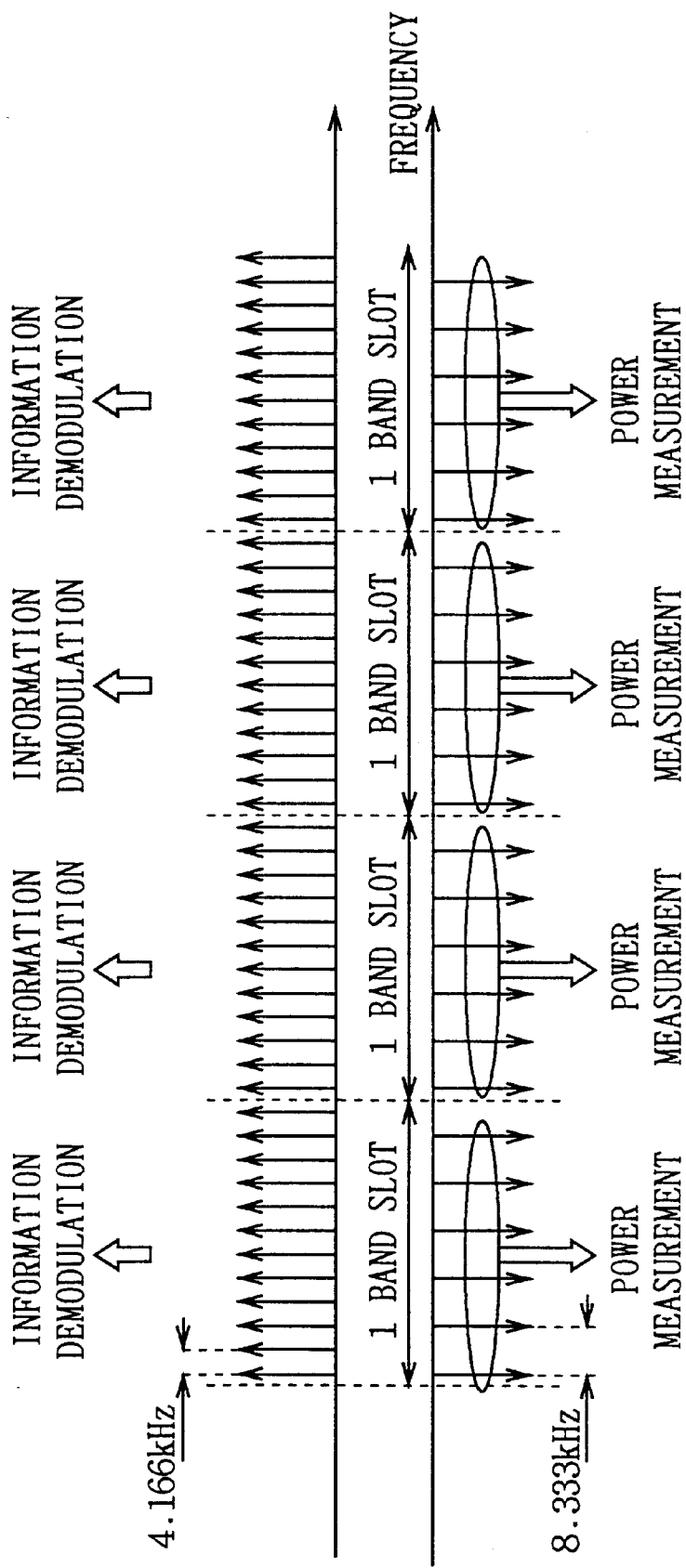
FIG. 6 is a schematic diagram illustrating a sub-carrier which is taken out at the time when measuring the reception power.

At this point, the concept of sub-carrier to be taken out by the fast Fourier transform processing is shown referring to FIG. 6. When demodulating the information, since the fast Fourier transform processing is applied to the signal element for 240 µs, the sub-carrier is taken out with the 4.166 kHz interval as shown on the upper stage of FIG. 6. On the other hand, when measuring the power, since the fast Fourier transform processing is applied to the signal element for its halve 120 µs and sub-carrier is taken out, the sub-carrier is taken out with the 8.333 kHz interval as shown on the lower stage of FIG. 6. In the base station, when measuring the reception power of the communication terminal device MS10, sub-carrier is taken out with 8.333 kHz interval per 1 slot, and the reception power for 1 slot is measured by using the sum of the power of these sub-carriers taken out.

Figure 7:
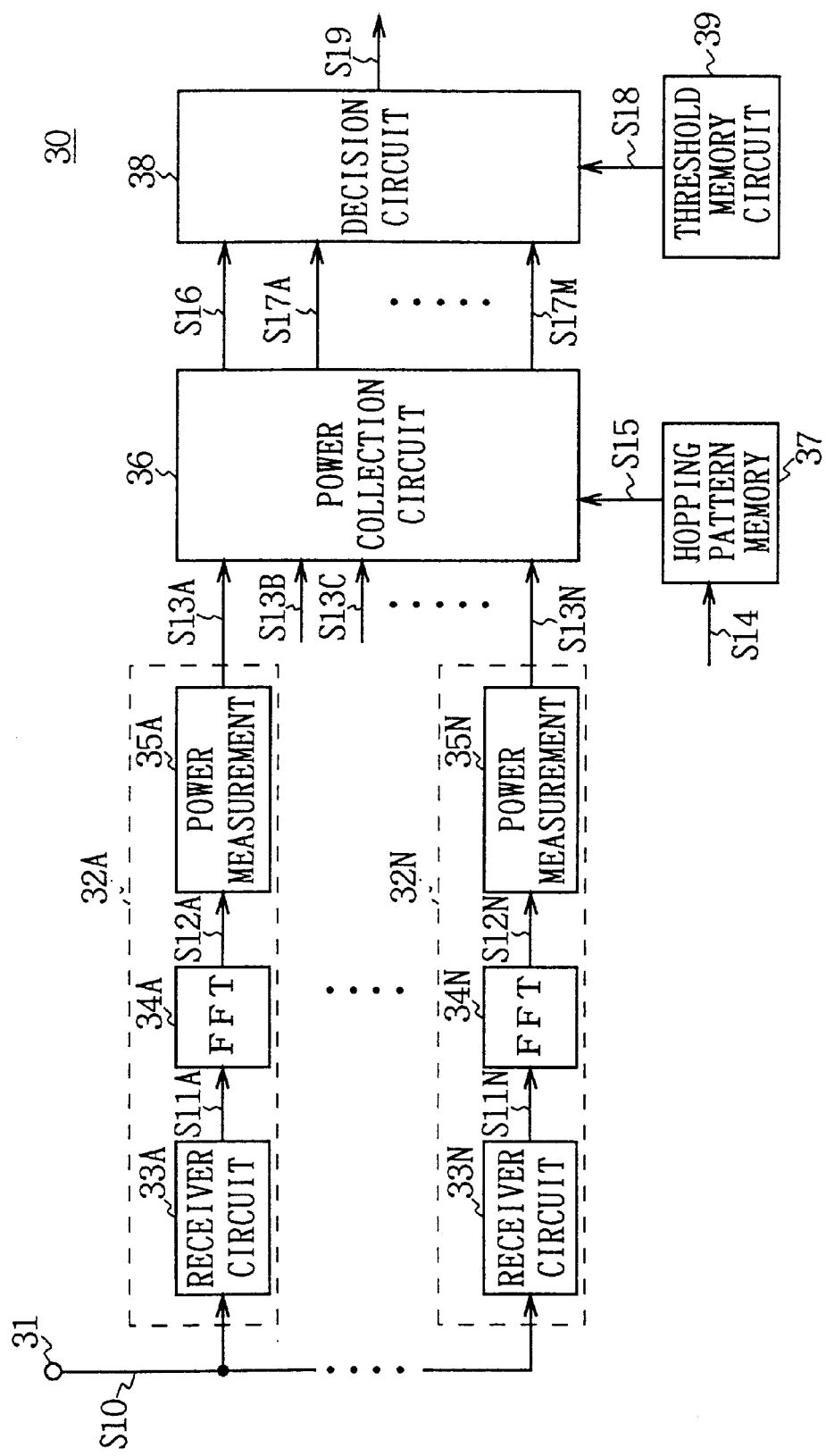
FIG. 7 is a block diagram showing the construction of an electric power measuring unit provided in the base station.

At this point, the power measuring unit provided in each base station BS21–BS27 is shown in FIG. 7. The power measuring unit as shown in this Figure is provided in each base station BS21–BS27 of the cellular wireless communication system 20. By using said power measuring unit 30, the traffic channel which the communication terminal device MS10 is using, is received based on the control information informed from the base station presently in communication, and the reception power from said communication terminal device MS10 is measured. Based on said reception power, the power measuring unit 30 determines whether to handoff the communication terminal device MS10 or not, and said reply information whether to handoff or not is formed.

At first, received signal S10 received with an antenna not shown in Figure is entered into signal processing circuits 32A–32F for power measurement respectively via an input terminal 31. The signal processing circuit 32A firstly supplies the received signal S10 to the receiver circuit 33A. The receiver circuit 33A, after amplifying the received signal S10, extracts the baseband signal applying the frequency conversion to said received signal S10 and providing the filtering processing to said baseband signal, takes out the desired signal element, provides the analog-to-digital conversion processing to this, and outputs this. The fast Fourier transform circuit (FFT) 34A, after taking out the signal element for 120 µs as described above by conducting the windowing processing to digital baseband signal S11A to be sent out from the receiver circuit 33, extracts signal element of the sub-carrier by applying the fast Fourier transform processing to said signal element with the interval of 8.333 kHz. The power measuring circuit 35A measures the reception power for one slot from the signal element S12A of the sub-carrier to be supplied from the fast Fourier transform circuit 34A, and outputs the measured value S13A to the power collection circuit 36. The signal processing circuit 32A repeats power measuring processings per 120 µs, and measures the reception power successively with one half of one slot period.

The signal processing circuit 32 measures the reception power of the slot positioned adjacent to the slot calculated at the signal processing circuit 23A on the frequency axis by the same processing, and outputs the measured value S13B to the power collection circuit 36. In the same way, in the signal processing circuit 32B–32N, the slot power of different frequency channels is measured, and the measured values S13C–Sl3N is transmitted to the power collection circuit 36 respectively. Accordingly, by measuring the reception power in parallel providing multiple signal power circuits 32A–32N, multiple reception powers of all frequency channels prepared on the frequency axis as shown in FIG. 4 can be measured all at once.

The control information S14 notified from the base station in communication is supplied to a hopping pattern memory circuit 37. The hopping pattern memory circuit 37 extracts the pattern information of the hoping pattern of the traffic channel which the communication terminal device MS10 is presently using and the hopping pattern of the traffic channel which the base station of the information source is not using from the control information, and memorizes these in the memory area. Then, the hopping pattern memory circuit 37 transmits the memorized pattern information S15 of the hopping pattern of the traffic channel which the communication terminal device MS10 is using and the hopping pattern of the traffic channel (where the number of channels to be M) which the base station of the information source is not using, to the power collection circuit 36.

The power collection circuit 36 picks up the received signal of the slot which is considered that the communication terminal device MS10 is using based on the pattern information S15 to be supplied from the hopping pattern memory circuit 37, collects these over several slots (e.g., 16–64 slots), calculates the average reception power S16 by dividing said collected reception power by the number collected, and outputs this to the decision circuit 38. In the same way, the power collection circuit 36 picks up the reception power of the slot corresponding to the traffic channel which the base station of the information source is not using based on the pattern information S15 supplied from the hopping pattern memory circuit 37, collects the reception power for several slots, calculates the average reception power S17A–S17M, and outputs this to the decision circuit 38.

The decision circuit 38, by collecting the reception power S16 further for several times and obtaining the average value, calculates the average reception power A described above, and simultaneously by collecting the reception power S17A–S17M for multiple times, calculate the average reception power B described above. And the decision circuit 38, after obtaining the reception power C by subtracting the average reception power B from the average reception power A, receives the threshold information S18 showing the decided threshold s from the threshold memory circuit 39, and compares said decided threshold s with the reception power C. As a result, if the reception power C is larger than the decided threshold s, the decision circuit 38 determines that it is better to connect the communication terminal device MS10 to its own station, and transmits the reply information S19 to the base station of the information source via the transmission circuit (not shown in Figure). In this connection, said reply information S19 contains information of the reception power C.

In this connection, the embodiment described above has dealt with the case where the same communication terminal device MS10 conducts handoffs to the same base station for the plural number of times in a short time period, the decided threshold value s is changed. However, in said case, the decided threshold value s memorized in the threshold memory circuit 39 is changed.

Figure 8:
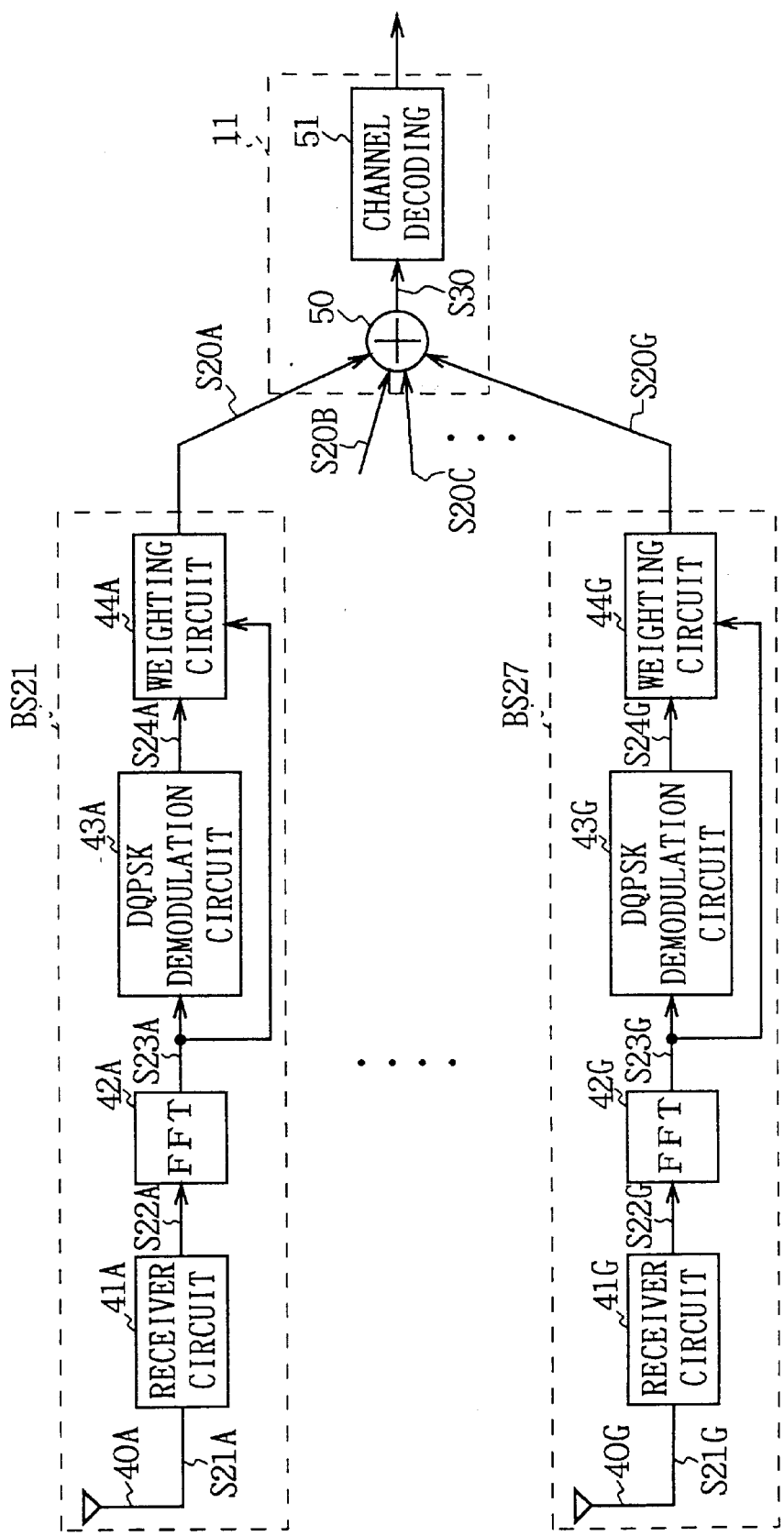
FIG. 8 is a block diagram illustrating the construction of circuits provided for diversity reception of the whole system.

At this point, a receiver system circuit for demodulating the information in base stations BS21–BS27 and a combining circuit for diversity reception in the connection switching station 11 is shown in FIG. 8. Each base station BS21–BS27 has the receiver circuit having the same construction respectively, receives the traffic channel which the communication terminal device MS10 is using by this receiver system circuit, and outputs the resulting reception signals S20A–S20G to the connection switching station 11 of the higher stage respectively. More specifically, the base station BS21 is equipped with the receiver system circuit comprising an antenna 40A, a receiver circuit 41A, a fast Fourier transform circuit (FFT) 42A, a DQPSK demodulation circuit 43A and a weighting circuit 44A. The base station BS21 forms a reception signal S20A by said receiver system circuit. Since base stations BS22–BS27 are equipped with the receiver system circuits having the same constructions respectively, explanations are omitted at this point.

In the base station BS21, firstly the reception signal S21A of the traffic channel received by the antenna 40A is entered into the receiver circuit 41A. The receiver circuit 41A, after amplifying the reception signal S21A, takes out the baseband signal applying the frequency conversion to said reception signal S21A, and outputs this after applying analog-to-digital conversion processing.

The fast Fourier transform circuit 42, after taking out the signal elements for 240 μs applying the windowing processing to the digital baseband signal S22A to be transmitted from the receiver circuit 41A as described above, extracts the signal element of sub-carrier at 4.166 kHz intervals. The DQPSK demodulation circuit 43A conducts the DQPSK demodulation (differential quadrature phase shift demodulation) to signal element S23A to be supplied from the fast Fourier transform circuit 42, forms reception symbol in a state of S24A QPSK modulated, and outputs this to the weighting circuit 44A.

The weighting circuit 44A, as well as calculating the reception power of the reception signal 21A based on the signal element S23A to be supplied from the fast Fourier transform circuit 42A and the receive symbol S24A to be supplied from the DQPSK demodulation circuit 43A, calculates the power of interference wave element contained in said reception signal S21A, and based on these power values calculates the signal-to-interference wave power ratio C/I. And if said signal-to-interference wave power ratio C/I is larger than the threshold value q described above, the weighting circuit 44A conducts the weighting processing to said receive symbol S24A by multiplying the reception symbol S24A by the weighting coefficient corresponding to said signal-to-interference wave power ratio C/I, and outputs this to the connection switching station 11 of the higher stage as reception signal S20A.

In the same way, in the base stations BS22–BS27, after receiving traffic channels, the signal-to-interference wave power ratio C/I is calculated according to the same processing as described above. If said signal-to-interference wave power ratio C/I is larger than the threshold value q, multiplying the weight coefficient corresponding to said signal-to-interference wave power ratio C/I, the weighted reception signals S20B–B20G is transmitted.

Accordingly, since the reception signals S20A–S20G to be sent out from the base stations BS21–BS27 have been weighted corresponding to the signal-to-interference wave power ratio C/I already, the composite reception signal S30 based on the maximum ratio combining method can be easily obtained by only adding the reception signal S20A–S20G by the adder circuit 50 in the connection switching station 11 of the higher stage. Thus, in the connection switching station 11, if said composite reception signal S30 is entered to the channel decoding circuit 51 and the channel decoding is conducted, the data having the communication quality improved by the site diversity reception can be restored.

According to the foregoing construction, in this cellular wireless communication system 20, the base station BS21 in communicating with the communication terminal device MS10, judges whether it is better to handoff said communication terminal device MS10 to the other base station or not, based on the pathloss information to be transmitted from said communication terminal device MS10 or the value of reception power using in communication with the communication terminal device MS10. More specifically, in the case where it is judged that the base station having the same or smaller pathloss than own station exists based on the pathloss information, the base station BS21 in communication judges that it is better to handoff the communication terminal device MS10 to the other station, and transmits control information containing information on traffic channel, which the communication terminal device MS is using and said base station BS21 is not using to the peripheral base stations.

Based on said control information, the peripheral base stations BS22–BS27 received the control information, grasp the traffic channel which the communication terminal device MS10 is using, and by receiving said traffic channel, calculate the average reception power A of the traffic channel which the communication terminal device MS10 is using. Moreover, in tandem with this, the peripheral base stations BS22–BS27, by grasping the traffic channel which is not being used by the base station BS21 based on the control information received and receiving said traffic channel, calculate the average reception power B of traffic channels which are not being used in the base station BS21. In this case, the average reception power A is the power in which the reception signal from the communication terminal device MS10 and the interference wave power are combined, and the average reception power B is formed of only the interference wave power. Thus, the base stations BS22–BS27 received the control information calculate the pure reception power C from the communication terminal device MS10 by subtracting the average reception power B from the average reception power A.

When the peripheral base stations BS22–BS27 calculate the reception power C, compare said reception power C with the decided threshold value s. As a result, if the reception power C is larger than the decided threshold value s, the peripheral base stations BS22–BS27 judge that it is better to connect the communication terminal device MS to own station, and transmit the reply information (said reply information contains the reception power C calculated) specifying the connection to own station to the base station BS21 which is the source of notification of the control information.

The base station of notification source determines the base station having the largest reception power C contained in the reply information as the base station of handoff destination. Then, the base station BS21 of information source receives channel information regarding the traffic channel for the communication between the communication terminal device MS10 from said base station, and transmits this to said communication terminal device MS10 via the wireless circuit. Thus, the communication terminal device MS10 conducts the handoff processing with the base station of handoff destination based on said channel information, and connects the wireless circuit to said base station.

Accordingly, in this cellular wireless communication system 20, when it is judged better that the communication terminal device MS10 should be conducted handoff based on the pathloss information or the value of transmission signal to the communication terminal device MS10, the base station BS21 in communication with said communication terminal device MS10 sends the control information to the peripheral base stations, and instructs to monitor said communication terminal device MS10. Then, based on said control information, the peripheral base station measures the reception power C from the communication terminal device MS10. If said reception power C is larger than the decided threshold value s, the peripheral base station sends the reply information showing to connect the communication terminal device MS10 to own station, to the base station BS21 of the notification source. Thus, the base station BS21 of the notification source judges that the base station, having the largest reception power C contained in the reply information, is the base station having the best signal receiving condition (the base station having the smallest pathloss). The base station BS21 then determines said base station as the handoff destination, and conducts handoff of the communication terminal device MS10 to said base station.

According to the above processing, the base station having the smallest pathloss can be decided as the handoff destination of the communication terminal device MS10 in this cellular wireless communication system 20. Moreover, as a result, since handoff can be conducted to the base station having the smallest pathloss, the communication quality between the communication terminal device MS10 and the base station can be improved. Furthermore, in this cellular wireless communication system 20, since the communication can be conducted with the base station having the smallest pathloss, the indiscriminate increase of transmission signal can be prevented. As a result, interference waves can be decreased, and the terminal storage capacity of the whole system, that is the system capacity, can be increased.

According to the foregoing construction, when there is the possibility that it is better if the base station in communication with the communication terminal device conducts handoff of said communication terminal device, it causes the peripheral base station to observe said communication terminal device and to measure reception power from said communication terminal device, and by conducting the handoff of the communication terminal device to the base station having the largest reception power, the communication terminal device can be provided handoff to the base station having the smallest pathloss. Thus, the communication terminal device can be provided handoff to the base station having the smallest pathloss, the communication quality between base station and the communication terminal device, can be easily improved.

(3) Other Embodiments

The first embodiment described above has dealt with the case of conducting the frequency hopping to change frequency to be used per slot. However, the prevent invention is not only limited to this but also by fixing the frequency to be used without conducting the frequency hopping, the same effects as those of the above can be obtained. In short, when receiving the traffic channel informed by the base station in communication, which the communication terminal device is using, and it is considered that the receiving condition of that traffic channel is satisfactory because the signal-to-interference wave power ratio of said channel is larger than the predetermined threshold value, if the reception signal obtained by receiving said channel is transmitted to the connection switching station, and reception signal to be transmitted from each station is combined at said connection switching station, the diversity reception using the whole system can be conducted, and the communication quality of the upward direction can be easily improved.

Furthermore, the first embodiment described above has dealt with the case of informing the traffic channel which the communication terminal device MS10 is using to the base station when the base station of which the pathloss ratio X/Y between the pathloss value of its own station Y and the pathloss value of peripheral base station X, is lower than. the predetermined threshold value p. However, the present invention is not only limited to this but also the base station having the pathloss lower than own station can be found using the other method. In short, based on the pathloss information from the communication terminal device, the base station having the pathloss lower than own station is found, and the traffic channel which the communication terminal device is using is notified to said base station, the same effects as those of the above can be obtained.

Furthermore, the second embodiment described above has dealt with the case of conducting the frequency hopping. to change frequency to be used per slot. However, the present invention is not only limited to this but also if the frequency to be used is fixed without conducting the frequency hopping, the same effects as those of the above can be obtained. In short, when the base station in communication with the communication terminal device considers that it is better to handoff the communication terminal device, it notifies the traffic channel which said communication terminal device is using to the peripheral stations. The peripheral stations receive said traffic channel, measure the reception power from the communication terminal device, and notify this to the base station of information source. If the base station of information source decides the base station having the largest reception power as the handoff destination, the communication terminal device can be conducted handoff to the base station having the smallest pathloss, and the communication quality between the base station and the communication terminal device can be easily improved.

Furthermore, the second embodiment described above has dealt with the case of transmitting the reply information containing the reception power C if the measured reception power C exceeds the predetermined threshold value s, the base station determines that it is better to connect the communication terminal device MS10 to own station. However, the present invention is not only limited to this but also by continuing the measurement of reception power C during the fixed period of time even in the case where the measured reception power C does not exceed the threshold value s, and by notifying the reply information containing said reception power C to the base station of information source when the measured reception power C exceeds the threshold value s during said period and terminating the reception of the communication channel even when the reception power C does not exceed the threshold value s during said period, the same effects as those of the above can be obtained.

Moreover, the second embodiment described above has dealt with the case of deciding the base station having the largest reception power contained in reply information as the handoff destination. However, the present invention is not only limited to this but also by measuring the reception power from said communication terminal device at the base station in communication with the communication terminal device and including said base station in candidates of the handoff destination and deciding the base station having the largest reception power from among all base stations as the handoff destination, the same effects as those of the above can be obtained.

According to the present invention as described above, since the communication channel which the mobile station is using is notified to the base station having the pathloss lower than the own station, said base station receives said communication channel and transmits reception signal to the connection switching station, and the connection switching station combines reception signals to be transmitted and providing the decoding processing to said composite reception signal, decodes the data to be transmitted from the mobile station, the reception signals received at the base station having the satisfactory receiving condition can be combined and the diversity reception by the whole system can be conducted and thereby the communication quality from the mobile station to the base station can be easily improved.

Furthermore, in the case where it is judged better to handoff the mobile station based on the pathloss information from the mobile station or the transmission power to the mobile station, by notifying the communication channel which the mobile station is using to the desired base station and the base station received said notice receives said communication channel and measures the reception power from the mobile station, and if said reception power exceeds the predetermined first threshold value, the base station notifies reply information containing said reception power to the base station of information source, and the base station of information source received this determines the base station having the largest reception power contained in the reply information as the base station of handoff destination, the mobile station can be provided handoff to the base station having the smallest pathloss and the best receiving condition, and as a result, the communication quality between the mobile station and the base station can be further improved.

While there has been described in connection with the preferred embodiments of the invention, it will be obvious to those skilled in the art that various changes and modifications can be aimed, therefore, to cover in the appended claims all such changes and modifications as fall within the true spirit and scope of the invention.

What is claimed is:

1. A cellular wireless communication system having mobile stations, base stations and connection switching stations for controlling said base stations, and for communicating between said mobile stations and said base stations by time division multiplexing connections, said cellular wireless communication system comprising:

a mobile station;

a first base station configured to communicate with said mobile station over a communication channel;

at least one other base station, wherein said mobile station, during communication with said first base station, is configured to receive a plurality of control channels from said first base station and said at least one other base station to measure a plurality of path losses therebetween, and is further configured to transmit a plurality of path loss information showing the measured plurality of path losses to said first base station; and a connection switching station, wherein said first base station is configured to transmit a first reception signal received from said mobile station to said connection switching station, to determine that said at least one other base station has a smaller path loss than said first base station based on said plurality of path loss information, and in accordance therewith to indicate said communication channel to said at least one other base station, wherein said at least one other base station is configured to receive the indicated communication channel and to measure a signal-to-interference wave power ratio thereof, and when the measured signal-to-interference wave power ratio is larger than a first threshold value, to transmit, to said connection switching station, a second reception signal received on said communication channel from said mobile station, and wherein said connection switching station is configured to combine said first reception signal and said second reception signal into a composite reception signal, to perform decoding processing to said composite reception signal, and to output the decoded composite reception signal.

2. The cellular wireless communication system according to claim 1, wherein:

when communicating between said first base station and said mobile station, frequency hopping is conducted in order to sequentially switch a frequency used.

3. The cellular wireless communication system according to claim 1, wherein:

said communication channel is composed of multiple sub-carriers, and multi-carrier communication is conducted between said first base station and said mobile station.

4. The cellular wireless communication system according to claim 1, wherein:

said at least one other base station is configured to terminate reception of said communication channel when, during a predetermined period of time, a second ratio is more than a second threshold value, wherein said second ratio is based on the measured signal-to-interference wave power ratio and said first threshold value when the measured signal-to-interference wave power ratio does not exceed said first threshold value.

5. A cellular wireless communication system having mobile stations, base stations and connection switching stations for controlling said base stations, and for communicating between said mobile stations and said base stations by time division multiplexing connections, said cellular wireless communication system comprising:

a mobile station;

a first base station configured to communicate with said mobile station over a communication channel;

at least one other base station, wherein said mobile station, during communication with said first base station, is configured to receive a plurality of control channels from said first base station and said at least one other base station to measure a plurality of path losses therebetween, and is further configured to transmit a plurality of path loss information showing the measured plurality of path losses to said first base station; and a connection switching station, wherein said first base station is configured to transmit a first reception signal received from said mobile station to said connection switching station, to determine that said at least one other base station has a smaller path loss than said first base station based on said plurality of path loss information, and in accordance therewith to indicate said communication channel to said at least one other base station, wherein said at least one other base station is configured to receive the indicated communication channel and to measure a signal-to-interference wave power ratio thereof, and when the measured signal-to-interference wave power ratio is larger than a first threshold value, to transmit, to said connection switching station, a second reception signal received on said communication channel from said mobile station, wherein said connection switching station is configured to combine said first reception signal and said second reception signal into a composite reception signal, to perform decoding processing to said composite reception signal, and to output the decoded composite reception signal, and wherein said at least one other base station is configured to terminate reception of said communication channel when, during a predetermined period of time, a second ratio is more than a second threshold value, wherein said second ratio is based on the measured signal-to-interference wave power ratio and said first threshold value when the measured signal-to-interference wave power ratio does not exceed said first threshold value.

6. A cellular wireless communication system having mobile stations, base stations and connection switching stations for controlling said base stations, and for communicating between said mobile stations and said base stations by time division multiplexing connections, said cellular wireless communication system comprising:

a mobile station;

a first base station configured to communicate with said mobile station over a communication channel;

at least one other base station, wherein said mobile station, during communication with said first base station, is configured to receive a plurality of control channels from said first base station and said at least one other base station to measure a plurality of path losses therebetween, and is further configured to transmit a plurality of path loss information showing the measured plurality of path losses to said first base station; and a connection switching station, wherein said first base station is configured to transmit a first reception signal received from said mobile station to said connection switching station, and to identify to said at least one other base station said communication channel when it is determined that said mobile station should be handed off to said at least one other base station based on at least one of said plurality of path loss information and a value of transmission power to said mobile station, wherein said at least one other base station is configured to receive the identified communication channel and to measure a reception power thereof, and when the measured reception power is more than a first threshold value, to transmit reply information indicating said reception power to said first base station, wherein said first base station is further configured to identify said at least one other base station having a largest reception power according to said reply information as a destination of handoff, and in accordance therewith to hand off said mobile station to said at least one other base station, and wherein said at least one other base station, when the measured reception power does not exceed said first threshold value, is configured to continuously measure said reception power during a fixed period of time, and when said reception power exceeds said first threshold value during said fixed period of time, to identify said reply information to said first base station, and when said reception power does not exceed the first threshold value during said fixed period of time, to terminate reception of said communication channel.

7. A cellular wireless communication system having mobile stations, base stations and connection switching stations for controlling said base stations, and for communicating between said mobile stations and said base stations by time division multiplexing connections, said cellular wireless communication system comprising:

a mobile station;

a first base station configured to communicate with said mobile station over a communication channel;

at least one other base station, wherein said mobile station, during communication with said first base station, is configured to receive a plurality of control channels from said first base station and said at least one other base station to measure a plurality of path losses therebetween, and is further configured to transmit a plurality of path loss information showing the measured plurality of path losses to said first base station; and a connection switching station, wherein said first base station is configured to transmit a first reception signal received from said mobile station to said connection switching station, and to identify to said at least one other base station said communication channel when it is determined that said mobile station should be handed off to said at least one other base station based on at least one of said plurality of path loss information and a value of transmission power to said mobile station, wherein said at least one other base station is configured to receive the identified communication channel and to measure a reception power thereof, and when the measured reception power is more than a first threshold value, to transmit reply information indicating said reception power to said first base station, wherein said first base station is further configured to identify said at least one other base station having a largest reception power according to said reply information as a destination of handoff, and in accordance therewith to hand off said mobile station to said at least one other base station, wherein said first base station, after conducting handoff of the mobile station to said at least one other base station, is further configured to receive said communication channel, and when a signal-to-interference wave power ratio of said communication channel exceeds a second threshold value, to transmit a second reception signal to said connection switching station, and wherein said connection switching station is further configured to conduct decoding processing to a composite reception signal obtained by combining said first reception signal and said second reception signal, so as to decode data transmitted from said mobile station.

8. The cellular wireless communication system according to claim 7, wherein:

said first base station, during a predetermined period of time, in case where a second ratio is more than a third threshold value, is configured to terminate reception of said communication channel, wherein said second ratio is based on the measured signal-to-interference wave power ratio and said second threshold value when the measured signal-to-interference wave power ratio does not exceed said second threshold value.

9. A cellular wireless communication system having mobile stations, base stations and connection switching stations for controlling said base stations, and for communicating between said mobile stations and said base stations by time division multiplexing connections, said cellular wireless communication system comprising:

a mobile station;

a first base station configured to communicate with said mobile station over a communication channel;

at least one other base station, wherein said mobile station, during communication with said first base station, is configured to receive a plurality of control channels from said first base station and said at least one other base station to measure a plurality of path losses therebetween, and is further configured to transmit a plurality of path loss information showing the measured plurality of path losses to said first base station; and a connection switching station, wherein said first base station is configured to transmit a first reception signal received from said mobile station to said connection switching station, and to identify to said at least one other base station said communication channel when it is determined that said mobile station should be handed off to said at least one other base station based on at least one of said plurality of path loss information and a value of transmission power to said mobile station, wherein said at least one other base station is configured to receive the identified communication channel and to measure a reception power thereof, and when the measured reception power is more than a first threshold value, to transmit reply information indicating said reception power to said first base station, wherein said first base station is further configured to identify said at least one other base station having a largest reception power according to said reply information as a destination of handoff, and in accordance therewith to hand off said mobile station to said at least one other base station, wherein when handoff is repeated between said first base station and said at least one other base station in a short period of time, said first threshold value is changed.

10. The cellular wireless communication system according to claim 9, wherein:

when said first threshold value is changed, a transmission speed used in communication with said mobile station is decreased.

11. A cellular wireless communication system comprising:

a connection switching station; and at least one other base station, wherein said connection switching station is configured to receive a plurality of signals from a first base station and said at least one other base station, to determine whether said at least one other base station has a smaller path loss than a path loss of said first base station based on a plurality of path loss information, and in accordance therewith to identify a communication channel, which a mobile station is using to communicate with said first base station, to said at least one other base station, to combine a first reception signal from said first base station and a second reception signal from said at least one other base station into a composite reception signal, to perform decoding processing to said composite reception signal, and to output the decoded composite reception signal, wherein said at least one other base station is configured to receive the identified communication channel and to measure a signal-to-interference wave power ratio thereof, and when the measured signal-to-interference wave power ratio is larger than a first threshold value, to transmit, to said connection switching station, said second reception signal received on said communication channel.

12. A cellular wireless communication method for controlling mobile stations and base stations by connection switching stations, and for communicating between said mobile stations and said base stations by time division multiplexing connections, said cellular wireless communication method comprising the steps of:

communicating between a first base station and a mobile station over a communication channel;

during communication with said first base station, receiving by said mobile station a plurality of control channels from said first base station and at least one other base station to measure a plurality of path losses therebetween, and transmitting a plurality of path loss information showing the measured plurality of path losses to said first base station;

transmitting by said first base station a first reception signal received from said mobile station to a connection switching station, determining by said first base station that said at least one other base station has a smaller path loss than said first station based on said plurality of path loss information, and in accordance therewith identifying said communication channel to said at least one other base station;

receiving by said at least one other base station the identified communication channel and measuring a signal-to-interference wave power ratio thereof, and when the measured signal-to-interference wave power ratio is larger than a first threshold value, transmitting to said connection switching station a second reception signal received on said communication channel from said mobile station; and combining by said connection switching station said first reception signal and said second reception signal into a composite reception signal, conducting decoding processing to composite reception signal, and outputting the decoded composite reception signal.

13. The cellular wireless communication method according to claim 12, wherein:

when communicating between said first base station and said mobile station, frequency hopping is conducted in order to sequentially switch a frequency used.

14. The cellular wireless communication method according to claim 12, wherein:

said communication channel is composed of multiple sub-carriers, and multi-carrier communication is conducted between said first base station and said mobile station.

15. A cellular wireless communication method for controlling mobile stations and base stations by connection switching stations, and for communicating between said mobile stations and said base stations by time division multiplexing connections, said cellular wireless communication method comprising the steps of:

communicating between a first base station and a mobile station over a communication channel;

during communication with said first base station, receiving by said mobile station a plurality of control channels from said first base station and at least one other base station to measure a plurality of path losses therebetween, and transmitting a plurality of path loss information showing the measured plurality of path losses to said first base station;

transmitting by said first base station a first reception signal received from said mobile station to a connection switching station, determining by said first base station that said at least one other base station has a smaller path loss than said first station based on said plurality of path loss information, and in accordance therewith identifying said communication channel to said at least one other base station;

receiving by said at least one other base station the identified communication channel and measuring a signal-to-interference wave power ratio thereof, and when the measured signal-to-interference wave power ratio is larger than a first threshold value, transmitting to said connection switching station a second reception signal received on said communication channel from said mobile station;

combining by said connection switching station said first reception signal and said second reception signal into a composite reception signal, conducting decoding processing to signal, and outputting the decoded composite reception signal; and terminating reception of said communication channel during a predetermined period of time when a second ratio is more than a second threshold value, wherein said second ratio is based on the measure signal-to-interference wave power ratio and said first threshold value, when the measured signal-to-interference power ratio does not exceed said first threshold value.

16. A cellular wireless communication method for controlling a cellular wireless communication system having mobile stations, base stations and connection switching stations for controlling said base stations, and for communicating between said mobile stations and said base stations by time division multiplexing connections, said cellular wireless communication method comprising the steps of:

communicating between a first base station and a mobile station over a communication channel;

receiving by said mobile station a plurality of control channels from said first base station and at least one other base station and measuring a plurality of path losses therebetween, and transmitting a plurality of path loss information showing the measured plurality of path losses to said first base station; and transmitting by said first base station a first reception signal received from said mobile station to a connection switching station, and identifying to said at least one other base station said communication channel when it is determined that said mobile station should be handed off to said at least one other base station based on at least one of said plurality of path loss information and a value of transmission power to said mobile station;

receiving by said at least one other base station the identified communication channel and measuring a reception power thereof, and when the measured reception power is more than a first threshold value, transmitting reply information indicating said reception power to said first base station;

identifying by said first base station said at least one other base station having a largest reception power according to said reply information as a destination of handoff, and in accordance therewith handing off said mobile station to said at least one other base station;

when the measured reception power does not exceed said first threshold value, continuously measuring by said at least one other base station said reception power during a fixed period of time, and when said reception power exceeds said first threshold value during said fixed period of time, identifying by said at least one other base station said reply information to said first base station and when said reception power does not exceed the first threshold value during said fixed period of time, terminating by said at least one other base station reception of said communication channel.

17. The cellular wireless communication method for controlling a cellular wireless communication system having mobile stations, base stations and connection switching stations for controlling said base stations, and for communicating between said mobile stations and said base stations by time division multiplexing connections, said cellular wireless communication method comprising the steps of:

communicating between a first base station and a mobile station over a communication channel;

receiving by said mobile station a plurality of control channels from said first base station and at least one other base station and measuring a plurality of path losses therebetween, and transmitting a plurality of path loss information showing the measured plurality of path losses to said first base station; and transmitting by said first base station a first reception signal received from said mobile station to a connection switching station, and identifying to said at least one other base station said communication channel when it is determined that said mobile station should be handed off to said at least one other base station based on at least one of said plurality of path loss information and a value of transmission power to said mobile station;

receiving by said at least one other base station the identified communication channel and measuring a reception power thereof, and when the measured reception power is more than a first threshold value, transmitting reply information indicating said reception power to said first base station;

identifying by said first base station said at least one other base station having a largest reception power according to said reply information as a destination of handoff, and in accordance therewith handing off said mobile station to said at least one other base station;

after conducting handoff of the mobile station to said at least one other base station, receiving by said first base station the communication channel, and when a signal-to-interference wave power ratio of said communication channel exceeds a second threshold value, transmitting a second reception signal to said connection switching station; and conducting by said connection switching station decoding processing to a composite reception signal obtained by combining said first reception signal and said second reception signal, so as to decode data transmitted from said mobile station.

18. The cellular wireless communication method according to claim 17, wherein:

during a base predetermined period of time, when a second ratio is more than a third threshold value, terminating by said first base station reception of said communication channel, wherein said second ratio is based on the measured signal-to-interference wave power ratio and said second threshold value when the measured signal-to-interference wave power ratio does not exceed said second threshold value.

19. A cellular wireless communication method for controlling mobile stations and base stations by connection switching stations, and for communicating between said mobile stations and said base stations by time division multiplexing connections, said cellular wireless communication method comprising the steps of:

communicating between a first base station and a mobile station over a communication channel;

receiving a plurality of control channels by said mobile station, during communication with said first base station, from said first base station and at least one other base station, measuring a plurality of path losses therebetween, and transmitting by said mobile station a plurality of path loss information showing the measured plurality of path losses to said first base station;

transmitting by said first base station a first reception signal received from said mobile station to a connection switching station, and identifying to said at least one other base station said communication channel when it is determined that said mobile station should be handed off to said at least one other base station based on at least one of said plurality of path loss information and a value of transmission power to said mobile station;

receiving by said at least one other base station the identified communication channel and measuring a reception power thereof, and when the measured reception power is more than a first threshold value, transmitting reply information indicating said reception power to said first base station;

identifying by said first base station said at least one other base station having a largest reception power according to said reply information as a destination of handoff, and in accordance therewith handing off said mobile station to said at least one other base station; and changing said first threshold value when handoff is repeated between said first base station and said at least one other base station in a short period of time.

20. The cellular wireless communication method according to claim 19, further comprising:

decreasing a transmission speed used in communication with said mobile station when said first threshold value is changed.

21. A cellular wireless communication method comprising the steps of: receiving by a connection switching station a plurality of signals from a first base station and at least one other base station;

determining whether said at least one other base station has a smaller path loss than a path loss of said first base station based on a plurality of path loss information, and in accordance therewith identifying a communication channel, which a mobile station is using to communicate with said first base station, to said at least one other base station, combining a first reception signal from said first base station and a second reception signal from said at least one other base station into a composite reception signal, performing decoding processing to said composite reception signal, and outputting the decoded composite reception signal; and receiving by said at least one other base station the identified communication channel and measuring a signal-to-interference wave power ratio thereof, and when the measured signal-to-interference wave power ratio is larger than a first threshold value, transmitting the second reception signal received on said communication channel to said connection switching station.

* * * * *